United States Patent
Camatti et al.

(10) Patent No.: US 6,779,970 B2
(45) Date of Patent: Aug. 24, 2004

(54) BALANCING PISTON FOR CENTRIFUGAL COMPRESSORS WITH A SEAL WITH SMALL CELLS WHICH HAVE DIVERGENT PLAY

(75) Inventors: Massimo Camatti, Casalguidi (IT); Andrea Bernocchi, Antella (IT)

(73) Assignee: Nuovo Pignone Holding S.p.A., Florence (IT)

( * ) Notice: Subject to any disclaimer, the term of this patent is extended or adjusted under 35 U.S.C. 154(b) by 49 days.

(21) Appl. No.: 10/166,381

(22) Filed: Jun. 11, 2002

(65) Prior Publication Data

US 2003/0002977 A1 Jan. 2, 2003

(30) Foreign Application Priority Data

Jun. 27, 2001 (IT) .................................. MI2001A1348

(51) Int. Cl.[7] .............................................. F04D 29/66
(52) U.S. Cl. .................. 415/104; 415/119; 415/173.5; 415/174.5; 415/230
(58) Field of Search .............................. 415/104, 107, 415/119, 170.1, 173.1, 173.4, 173.5, 174.4, 174.5, 230; 277/411, 414, 500; 417/365

(56) References Cited

U.S. PATENT DOCUMENTS 1,853,133 A * 4/1932 Meyer ........................ 415/104
3,531,223 A * 9/1970 Daltry et al. ................ 417/409
4,416,457 A * 11/1983 McGinnis et al. ........... 277/414

FOREIGN PATENT DOCUMENTS

| DE | 337417 | 5/1921 | |
|----|--------|--------|---|
| FR | 2592688 | 7/1987 | |
| GB | 1331668 A | * 9/1973 | ................. 415/104 |
| SU | 1323754 A1 | * 7/1987 | ................. 415/107 |
| SU | 1332082 A1 | * 8/1987 | ................. 415/104 |

OTHER PUBLICATIONS

"Rotordynamic Coefficients for Compressible Flow in Tapered Annular Seals," Journal of Tribology, vol. 107, Jul. 1 1985, pp. 318–325.

Patent Abstracts of Japan No. 01237394, published Sep. 21 1989.

* cited by examiner

Primary Examiner—Christopher Verdier
(74) Attorney, Agent, or Firm—Nixon & Vanderhye PC

(57) ABSTRACT

Balancing piston for centrifugal compressors, to control and damp subsynchronous vibrations, comprising a cylindrical body which is secured onto the rotor and a cylindrical structure which contains the body on the stator side with interposition of a seal with small cells wherein the play between the rotor and the stator increased in the direction of the flow of gas through the play.

9 Claims, 3 Drawing Sheets

BALANCING PISTON FOR CENTRIFUGAL COMPRESSORS WITH A SEAL WITH SMALL CELLS WHICH HAVE DIVERGENT PLAY

The present invention relates to a device to control and damp the subsynchronous vibrations of centrifugal compressors.

BACKGROUND OF THE INVENTION

In general, centrifugal compressors are machines which impart to a compressible fluid a pressure which is greater than that at which it receives the fluid, providing the latter with the energy necessary for this pressure increase with one or more impellers or rotors disposed in series, which are provided with radial blades and are activated at a high speed, by means of a motor which in general is keyed onto the compressor shaft itself.

Typically the centrifugal compressors fulfill a great variety of uses with requirements for high capacities and medium-low pressures, such as in refrigeration systems, in the petrochemicals industry, for example ethylene systems, catalytic cracking systems, and units for compression of $CO_2$ in urea systems, in the energy industry, such as systems for LPG, for oxygen and the units for compression and release to the gas pipeline service. The power levels installed are in general substantial and the pressures are as much as 40 bars.

A general drawing of the structure of a centrifugal compressor is illustrated in FIG. 1, in order to illustrate the technical problem to which the present invention relates. The blades of the rotor 1, i.e. of the rotary part, co-operate with a stator 2, i.e. a fixed part which is interposed between the adjacent impellers and through which there passes the shaft 3, which connects and supports the impellers. The blades of the rotor can have various shapes, and in FIG. 1 impellers 4 are shown which have as blades closed channels 5, which make possible a structure with greater strength and improved guiding of the flows. The fixed part or stator consists of a body 6 which surrounds the outlet openings of the closed channels 5 of the impeller 4 and is subdivided into a plurality of deflector vanes 8 which, in the various stages, co-operate with the blades or channels of the preceding impeller in order to receive the fluid at a high speed, transform into pressure energy part of the speed which is impelling the fluid, and deflect and convey it into the innermost part of the blades of the successive compression impeller. The pressure of the fluid thus increases from stage to stage until it reaches its final value.

In the axial direction, there is generation of pressure differential between the various stages, which thus requires insertion on the shaft 3 of the rotor 1 of a system of seals between the rotor and stator of each stage, which limits as far as possible the phenomenon of reflux of the compressed fluid to the preceding stages, in order to maintain the compression performance at appropriate values.

As the pressure value progresses from upstream in the downstream direction, on the rotor body there is thus generation of axial and radial forces which must be equilibrated and balanced both statically and dynamically, owing to the presence of the inevitable irregularities over a period of time in the system as a whole.

One of the most sought-after characteristics of the rotors of centrifugal compressors, and of rotary machines which operate at high speed and with fluids at high pressures, is their dimensional stability even in the presence of operating variations caused by temporal irregularities of flow upstream or downstream or of the real density or pressure of the gas on which work is taking place. The forces which are generated by these irregularities of density or pressure of the fluid give rise, in the labyrinths of the seals at the ends of the machines and of the passages from stage to stage, to subsynchronous vibrations on the rotor which are extremely detrimental to the operation and efficiency of the machine. This tangential course of the fluid in the machine or wherever there is a part which rotates relative to a fixed part, with limited tolerances, such as in the sealing units or balancing pistons, gives rise to destabilizing forces and vibrations which must be balanced and damped.

The dynamic performance of the rotor must therefore always be controlled and included at the design stage of the installation for each specific application, with reference to its stability in terms both of flexure and torsion. For this reason, and taking into consideration the fact that the negative influence of these vibrations on the rotor depends directly on the flexure and torsion induced on it, as a solution there is a tendency to increase the rigidity of the rotor and decrease its flexibility, both by using shafts with a large diameter and by shortening their section with free flexure, by reducing as far as possible the pitch between the support bearings.

A consequence of the step of increasing the diameter of the shaft and shortening the pitch of the supports consists of the complication of the problem of the seals on the rotary shaft, and especially the seals to be produced between the stages with the highest pressure of the compressor and the surrounding atmosphere. An increase in the diameter thus corresponds to a greater linear development of the play to be controlled, thus limiting the flows of the compressed fluid which escapes via the play of the seals.

In recently designed compressors, in order to damp and restrict the phenomena of vibration, in addition to the normal bearings for support, and to withstand the axial thrust, balancing pistons are inserted in the end parts of the drive shaft of the compressor.

With reference to the play which exists between the elements which constitute the seals or the balancing pistons and which are interposed between the impeller or rotor part and the fixed part or stator, account must be taken of the fact that this play is necessary and its dimensions must be appropriate, taking into consideration both the foreseeable deformations caused by the mechanical stresses and the expansions/contractions caused by the temperature variations. When evaluating the flexure deformations of the various parts, account must also be taken of the parts own frequencies and of the modes of natural vibration in terms of flexure and torsion at the various speeds of the rotor. On the other hand as far as the thermal ranges are concerned, account must be taken of the dimensional variations caused by the temperature during the transient phases, in which the stator and rotor can heat up and cool down, and thus expand or contract, with a greater or lesser speed relative to one another.

Excessively narrow play causes friction, heating and wear which detracts from the efficiency, the factor of use and the technical service life of the machine. Excessive play detracts from the performance of the machine.

The balancing pistons which are placed at the ends of the compressor shafts can be of various types, with bodies provided with cavities or venting openings, and are used to create an action of damping, which assists control of the subsynchronous vibrations of the compressor. In recent times, in the balancing pistons for compressors, considerable preference has been given to the use of sealing bodies which are commonly known as honeycomb by persons skilled in the art. This type of balancing piston is shown by way of example in the detail in FIG. 1A.

On the rotor 1 side, on the body of the shaft 3, there is keyed a cylindrical body 10 which acts as a balancing piston and separates a space 11 inside the compressor in which a greater pressure exists, from a space 12 in which a lower pressure exists. The outer cylindrical surface 13 of the body 10 is smooth and is parallel to the axis of the shaft 3. On the stator 2 side, at the axial correspondence of the balancing piston 10, there is fitted a hollow cylindrical structure 15 which has in its interior a seal with an annular body 16 provided with a large number of small hollow cells, in the form of a honeycomb. The honeycomb seal 16 can be made of metal material in a known manner, and can be secured to the structure 15 by conventional means, for example by being brazed. Between the outer surface 13 of the balancing piston 10 and the surface of the honeycomb seal 16 opposite it, play 17 of a substantially constant value is normally maintained for the entire length affected by the piston 10.

The effect of damping of the subsynchronous vibrations of a compressor caused by this piston provided with a honeycomb seal is generally attributed to the small cell structure, which acts such as to change the acoustic response of the discharge of the fluid from the high-pressure space to the low-pressure space within the play 17 between the rotor part and the stator part. This effect can be attributed to the fact that during its discharge the fluid in fact encounters a succession of wider and narrower passages, in which it repeatedly slows down and accelerates, gradually losing energy and pressure, damping the vibrations, and losing energy by Bernoulli effect.

The object of the present invention is a balancing piston device which is more efficient in damping the vibrations of the rotors for centrifugal compressors, such as to improve their effects of damping and adaptability to a greater number of industrial applications.

In order to illustrate more clearly the characteristics and advantages of the present invention, the latter is described with reference to a typical embodiment which is illustrated in FIGS. 1, and 2–5 by way of non-limiting example.

DETAILED DESCRIPTION OF PREFERRED EMBODIMENTS OF THE INVENTION

Figure 1:
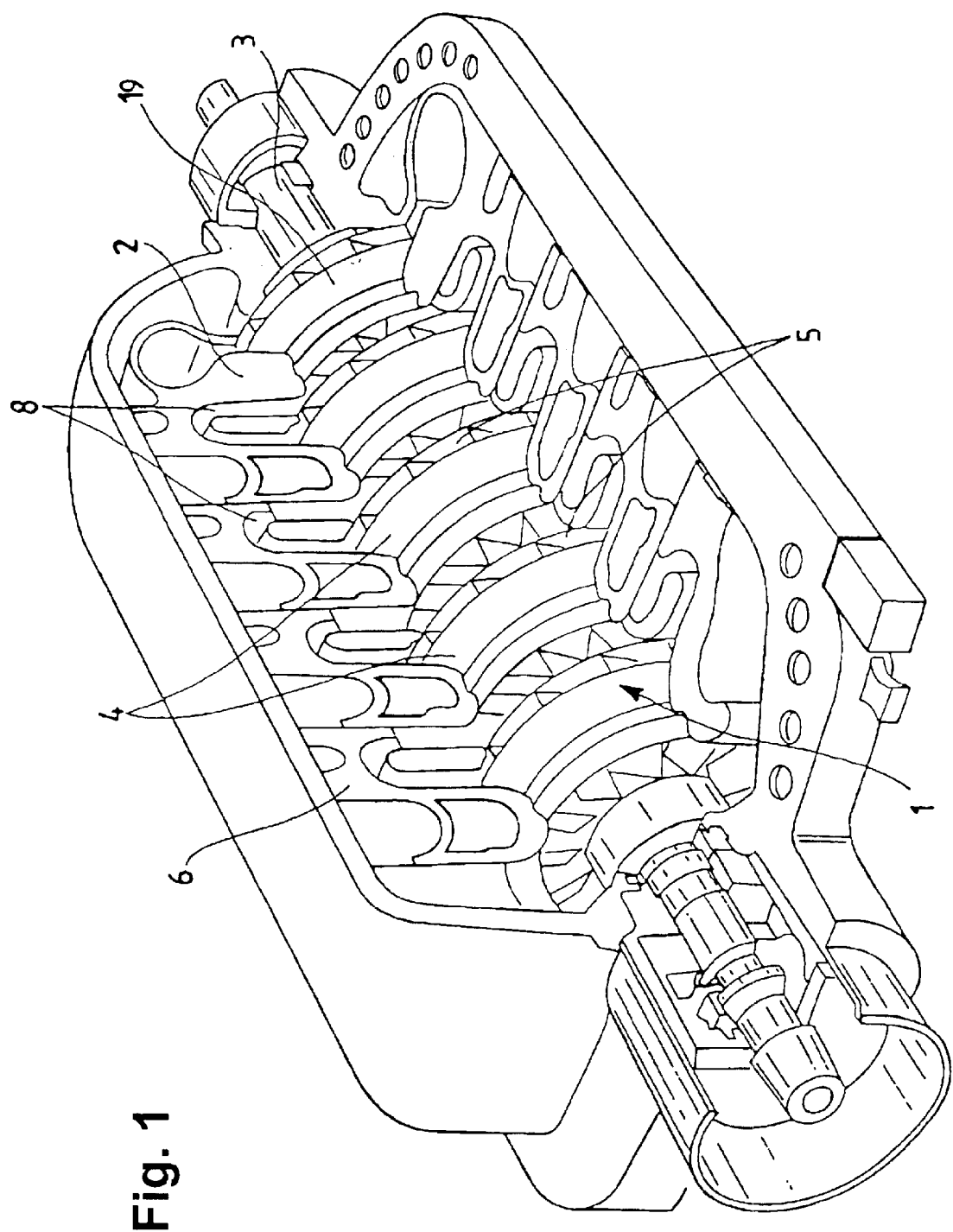
FIG. 1 illustrates the general structure of a centrifugal compressor, which is provided with a balancing piston illustrated in the detail in FIG. 1A according to the known art, in order to illustrate the problems faced and the effects to be achieved by the present invention.
Figure 1A:
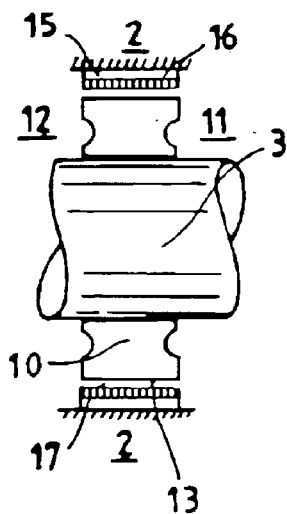
Figure 2:
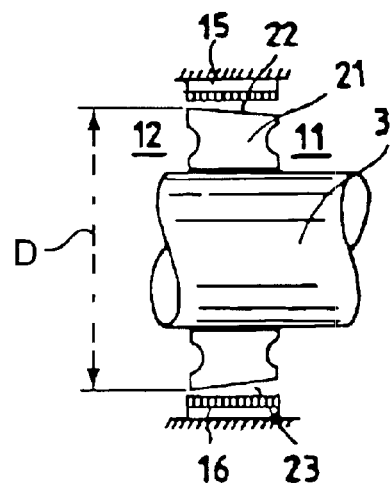
FIG. 2 illustrates an example of the structure of the balancing piston device according to the invention in a view in lateral cross-section.

The schematic embodiment of the invention illustrated by way of example in FIG. 2 has an overall structure which is similar to that in FIG. 1A, and is shown installed downstream from the final stage of the compressor.

On the drive shaft 3 of the compressor, downstream from the final stage of the compressor 19, there is keyed a cylindrical body 21 which acts as a balancing piston, and always separates a space 11 inside the compressor in which there exists a greater pressure, from a space 12 in which there exists a lower pressure. With reference to the outer diameter D of the cylindrical body 21, the axial dimension of the said cylindrical body is within the interval of 0.15 D and 0.5 D, and preferably between 0.25 D and 0.4 D.

The outer surface 22 of the body 21 is smooth and has a slightly frusto-conical development, such as to obtain play 23 which increases between the rotor part and the stator part, going from the space with the lower pressure to the space with the higher pressure, i.e. in the direction of the flow of the gas through the said play. Between the outer conical surface 22 of the body 21 and the surface of the honeycomb seal 16 which is fitted on the stator part and is opposite, there is thus obtained play 23 with a value which increases from a lower value to a greater value with a ratio between one another which is in the interval of 1.15 and 1.8 and is preferably between 1.25 and 1.45.

On the stator 2 side, at its part which contains the balancing piston 21, there is also fitted a hollow cylindrical structure 15 which has in its interior a seal of an annular body 16 containing a large number of cavities, and in particular in the form of a honeycomb. The depth of the small cells of the annular body connected to the stator varies in the interval of 1.0 and 10 mm and preferably between 4 and 7 mm. Annular bodies 16 which are provided with seals with small cells with a greater depth have a greater damping effect, but with a development which is rapidly asymptotic.

The honeycomb seal with a divergent conical shape provides development of the play which increases in the direction of the flow. This particular configuration can modify substantially the distribution of the speed and of the density of the gas which flows inside the seal with substantially spiral motion, taking into account the speed of rotation of the shaft 3 and of the surface 22 of the body of the piston relative to the honeycomb seal 16 which is connected to the stator. The result is that this configuration can increase significantly the damping forces which oppose the destabilizing forces caused by the tangential course of the gas both in the balancing drums and wherever there is a rotary part which is opposed by a fixed part, such as in the case of a rotor and a stator. The conicity of the play in the direction of the discharge is efficient enough to attenuate the tangential components of the speed of the gas in the piston.

Test campaigns on industrial prototypes have shown that when the same average value of the play 23 between the rotary body and the fixed seal is maintained and the dimensional ratios between the intake and output are varied in the interval between 1.0 and 1.5, the increase in the conicity of the said play in the direction of the flow makes it possible, with the other parameters remaining the same, to obtain increasing damping effects. During the tests, and whilst maintaining comparable test conditions, for conicity corresponding to the value 1.27 the increases in damping of the piston with conical play measured in comparison with those obtained with a piston with cylindrical play are included in the interval from 45% to 93%; for conicity corresponding to the value 1.43 these increases are included in the interval from 104% to 220%. In these conditions, the flow rate of the outflow through the play of the piston does not vary significantly with the conicity of the latter in the direction of the outflow, whereas there is a clear increase in the action of damping the effects of the tangential components, to which the destabilizing vibrations are attributed.

Figure 4:
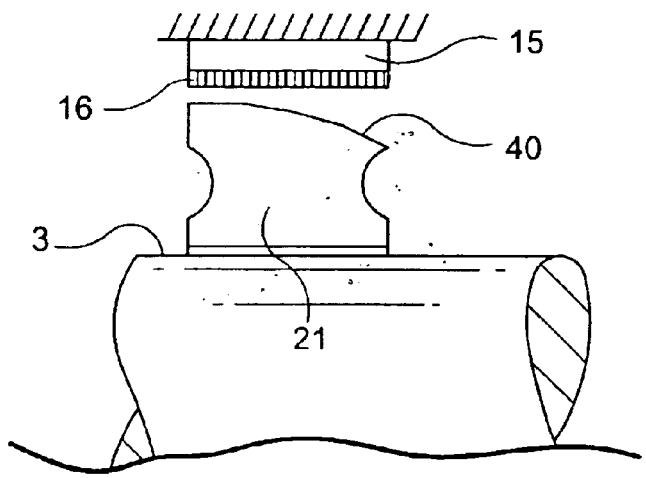
FIGS. 4–5 are views similar to FIG. 2 illustrating further embodiments of the invention.
Figure 5:
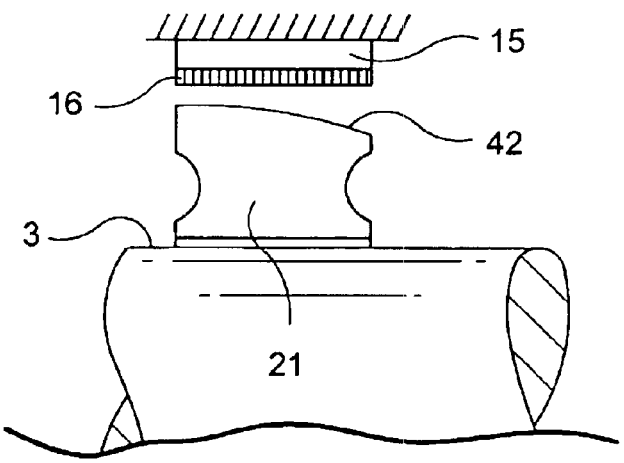

In the embodiment illustrated in FIG. 2, the frusto-conical development of the outer surface 22 of the body 23 is shown with a regular gradient; this gradient can also be diversified in the axial direction, and can be subdivided into several sections 40 (FIG. 4) with a diversified gradient, or it can be shaped according to a curve 42 (FIG. 5), provided that this gives rise to play which increases overall in the direction of the outflow.

Figure 3:
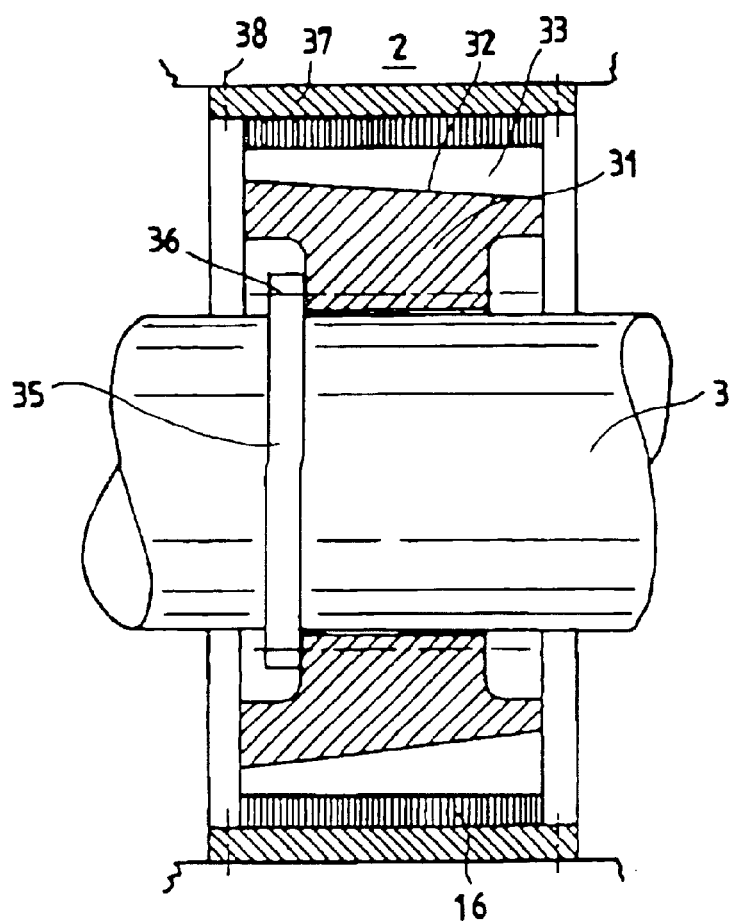
FIG. 3 illustrates in greater structural detail an embodiment of the device shown schematically in FIG. 2.

FIG. 3 illustrates a more detailed embodiment of the balancing piston according to the invention, compared with the more schematic embodiment in FIG. 2.

In general, centrifugal compressors are provided on an industrial basis according to standard model lines with increasing capacities and can cover a broad range of industrial applications, from which the model most suitable for the service for which it is required is selected case by case. This model is then adapted to the specific requirements of the case, according to variants and with accessories which are already available and provided, or can easily be prepared in the individual cases.

According to the specific services for which a standard centrifugal compressor in the series is destined, the performance levels required (for example flow rate, suction and delivery pressure) vary in each case, and there can also be variation of the physical characteristics of the gas to be compressed (for example molecular weight, viscosity, specific heats, intake temperature, as well as their field of variability); there is consequently also variation of the dimensions and configuration of the balancing piston required for this specific service.

Whereas in the applications of the petrochemicals industry the variations over a period of time of the performance levels required are foreseeably limited, in the applications in the energy industry, such as for services of compression and release in gas pipelines, the foreseeable variations of the performance levels which are required from the compressor are in general much greater, and throughout their field the damping of the subsynchronous vibrations must therefore be efficient.

It must also be taken into account that the balancing pistons are also subjected to wear and damage caused by the existence of very limited play between the stator part and the rotor part, and thus it is advisable to provide the possibility of dismantling and refitting the piston, both for the purpose of maintenance and for replacement and modification of its parts. The object is therefore to produce the balancing piston according to the invention with parts which can be removed and replaced, such that it can be fitted to the stator part and to the rotor part, with the possibility of modification, fitting and removal, both for the purposes of maintenance and adjustment in order to proportion and prepare the two parts appropriately for the specific service for which the centrifugal compressor is dedicated in the practical application.

As shown by way of example in FIG. 3, the cylindrical body 31 is produced in the form of a torus with a cross-section in the shape of a T, such as to provide it with the axial dimension, conicity and average play 33 relative to the surface of the honeycomb seal which faces it on the stator side. These dimensions correspond to the specific requirements of balancing and damping of the service to which the compressor is dedicated.

In its proportioning, it is the peripheral part of the T which must be modified in order to produce the play between the stator and rotor, as well as to obtain the effects of damping and sealing between the parts which are in relative motion. The remaining part of the piston 31 fulfils substantially the need for overall rigidity of the piston and for connection to the shaft 3.

Figure 6:
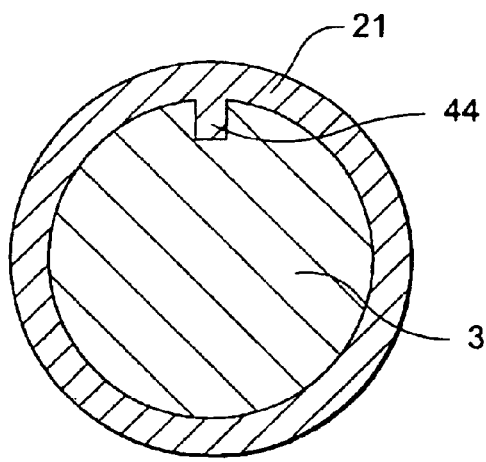
FIG. 6 is a fragmentary cross-sectional view taken about line 5—5 in FIG. 2.

The inner hole of the torus which constitutes the body 31 has a dimension and finishing such as to allow it to be installed on the shaft 3, by being keyed, at 44 (FIG. 6) with support and being secured onto the cylindrical neck 35 which is provided on the shaft itself, for example by means of a series of bolts 36, which are shown as a dot and dash line for the sake of simplicity, distributed along its circumference, and pass through holes of an appropriate size provided through the body 31.

On the stator 2 side, corresponding axially to the body 31 which is connected to the rotor, there is fitted a hollow cylindrical structure 37 which has continually in its interior and in its central part an annular seal 16 with cavities in the form of a honeycomb.

For this purpose, the useful part of the seal 16 has an axial length which is substantially the same as that of the outer T of the body 31 connected to the rotor. As already stated, this seal is made of metal material, in a known manner, and is secured to the structure 37 by being brazed or by equivalent means.

This type of connection permits replacement in the workshop of honeycomb seals which have deteriorated as a result of wear or damage during use of the compressor.

After the connection brazing has been carried out, the inner surface of the honeycomb seal 16 is worked and checked in order to assure that it has the correct level, circular cylindrical development which it needs in order to determine the play 33 required between the stator seal and the cylindrical body 31 which is secured to the rotor. Between the outer surface 32 of the balancing piston 31 which is connected to the rotor and the surface of the honeycomb seal 16 opposite there is normally maintained play which has a development and value predetermined for the length affected by the piston 31.

in the two parts of the structure 37 outside the honeycomb seal 16 there are provided holes for securing of the structure 37 to the body of the stator 2, for example by means of screws 38 which pass through these holes, which are shown as a broken line for the sake of simplicity of the drawing.

this type of embodiment makes it possible to produce and install the balancing piston which is suitably proportioned and prepared for the service for which the compressor is dedicated, as well as to overhaul, maintain and repair the piston.

What is claimed is:

1. A balancing piston for a centrifugal compressor to control and damp subsynchronous vibrations, comprising:
   a rotary component and a stationary component;
   a cylindrical body secured to a drive shaft of the compressor and separating spaces defining low and high pressure regions on opposite sides thereof;
   a fixed cylindrical structure having about an interior surface thereof an annular seal body, said seal body containing honeycomb cells on a side thereof in radial registration with said cylindrical body;
   an outer surface of said cylindrical body being smooth and having a frusto conical development to obtain play between the rotary component and the stationary component which increases in the direction of flow of a gas through the play from the low pressure region to the high pressure region, the distance between said frusto conical development along the outer surfaces of the rotary component and the inner surface of the honeycomb cells of the stationary component increasing from a lower value to a greater value having a ratio of the greater value to the lower value within a range of 1.15 to 1.8.

2. A balancing piston according to claim 1 wherein the ratio between the greater value and the lower value is within a range of 1.25 to 1.45.

3. A balancing piston according to claim 1 wherein the cylindrical body has an outer diameter, the axial dimension of said cylindrical body being within a range of 0.15 to 0.5 of said outer diameter.

4. A balancing piston according to claim 1 wherein the cylindrical body has an outer diameter, the axial dimension of said cylindrical body being within a range of 0.25 to 0.4 of said outer diameter.

5. A balancing piston according to claim 1 wherein the honeycomb cells have a depth within a range of 1.0 to 10 mm.

6. A balancing piston according to claim 1 wherein the honeycomb cells have a depth within a range of 4 to 7 mm.

7. A balancing piston according to claim 1 wherein said frusto conical development includes annular sections spaced from one another in an axial direction within increasing angles relative to the axis of the rotary component in the direction of the flow of the gas.

8. A balancing piston according to claim 1 wherein said frusto conical development includes a curved annular surface in the direction of the flow of the gas.

9. A balancing piston according to claim 1 wherein said cylindrical body and said cylindrical structure are detachable relative to one another.

* * * * *